United States Patent
Murata et al.

(10) Patent No.: US 12,485,760 B2
(45) Date of Patent: Dec. 2, 2025

(54) METHOD OF DISPLAY CONTROL AND DISPLAY CONTROLLER

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/433,987

(22) Filed: Feb. 6, 2024

(65) Prior Publication Data
US 2024/0262204 A1 Aug. 8, 2024

(30) Foreign Application Priority Data
Feb. 8, 2023 (JP) ................ 2023-017719

(51) Int. Cl.
*B60L 58/12* (2019.01)
*B60K 35/10* (2024.01)
(Continued)

(52) U.S. Cl.
CPC ............ *B60K 35/81* (2024.01); *B60K 35/10* (2024.01); *B60L 58/12* (2019.02); *B60L 58/16* (2019.02);
(Continued)

(58) Field of Classification Search
CPC .. B60K 35/81; B60K 35/10; B60K 2360/171; B60K 2360/119; B60K 2360/169; G01R 31/379; B60L 58/12; B60L 58/16
See application file for complete search history.

(56) References Cited

U.S. PATENT DOCUMENTS

| 2009/0082957 A1* | 3/2009 | Agassi | B60L 53/65 |
| | | | 701/532 |
| 2016/0117759 A1* | 4/2016 | Penilla | B60L 53/305 |
| | | | 705/26.9 |

(Continued)

FOREIGN PATENT DOCUMENTS

| CN | 109800899 A | 5/2019 | |
| EP | 4481664 A1 * | 12/2024 | ........... G06Q 10/087 |

(Continued)

*Primary Examiner* — Chico A Foxx
(74) *Attorney, Agent, or Firm* — Dinsmore & Shohl LLP

(57) ABSTRACT

A method of display control is a method of control of display by an ECU of a vehicle and a CPU of a management server, the ECU controlling an HMI that shows information on a plurality of replacement stations for replacement with a battery to be mounted on a vehicle. The method includes specifying for each replacement station, by the CPU of the management server, reference information on a degree of deterioration when a user selects the battery that is replaceable, the battery being stored at a replacement station that satisfies a prescribed condition among the plurality of replacement stations and controlling, by the ECU of the vehicle, the HMI to show the reference information together with information on the replacement station. The user can select the replacement station in consideration of the degree of deterioration of the battery.

7 Claims, 5 Drawing Sheets

(51) Int. Cl.
  *B60K 35/81*   (2024.01)
  *B60L 58/16*   (2019.01)
  *G01R 31/379*  (2019.01)

(52) U.S. Cl.
  CPC ...... *G01R 31/379* (2019.01); *B60K 2360/119* (2024.01); *B60K 2360/169* (2024.01); *B60K 2360/171* (2024.01)

(56) References Cited

U.S. PATENT DOCUMENTS

| | | | |
|---|---|---|---|
| 2018/0222343 A1* | 8/2018 | Uchida | G06Q 30/0631 |
| 2018/0253788 A1* | 9/2018 | Takatsuka | B60K 6/28 |
| 2018/0253789 A1* | 9/2018 | Takatsuka | G06Q 10/02 |
| 2019/0197608 A1 | 6/2019 | Iwai et al. | |
| 2020/0009990 A1 | 1/2020 | Shiiyama et al. | |
| 2020/0384879 A1* | 12/2020 | Ebisu | B60L 53/305 |
| 2021/0061127 A1 | 3/2021 | Sugino et al. | |
| 2022/0219564 A1* | 7/2022 | Aoto | B60L 53/65 |
| 2025/0083555 A1* | 3/2025 | Taguchi | H01M 10/44 |
| 2025/0091472 A1* | 3/2025 | Taguchi | B60L 53/80 |

FOREIGN PATENT DOCUMENTS

| | | | | |
|---|---|---|---|---|
| JP | 2015027223 A * | 2/2015 | | |
| JP | 2021-038943 A | 3/2021 | | |
| JP | 2024112580 A * | 8/2024 | | G06Q 50/06 |
| WO | WO-2020027092 A1 * | 2/2020 | | |
| WO | WO-2020111916 A2 * | 6/2020 | | B60L 58/12 |
| WO | WO-2021005706 A1 * | 1/2021 | | |

\* cited by examiner

FIG.5

| NAME | EXPECTED TIME BEFORE ARRIVAL | THE NUMBER OF WAITING VEHICLES | THE NUMBER OF BATTERIES SOH OF WHICH IS 70% OR HIGHER | BEST SOH | NEXT BEST SOH | POSSIBLE MILEAGE WITH THAT SOH |
|---|---|---|---|---|---|---|
| SHOP A | 5 MINs. | 1 | 3 | 90% | 80% | 400km |
| SHOP D | 18 MINs. | 2 | 5 | 85% | 75% | 375km |
| SHOP C | 12 MINs. | 3 | 3 | 80% | 70% | 350km |
| SHOP E | 15 MINs. | 4 | 6 | 75% | 70% | 350km |
| SHOP B | 9 MINs. | 5 | 7 | 70% | 70% | 350km |
| ... | ... | ... | ... | ... | ... | ... |

METHOD OF DISPLAY CONTROL AND DISPLAY CONTROLLER

CROSS REFERENCE TO RELATED APPLICATIONS

This nonprovisional application is based on Japanese Patent Application No. 2023-017719 filed with the Japan Patent Office on Feb. 8, 2023, the entire contents of which are hereby incorporated by reference.

BACKGROUND

Field

This disclosure relates to a method of display control and a display controller, and particularly to a method of display control by a display controller that controls a display apparatus that shows information on a plurality of replacement facilities for replacement with a battery to be mounted on a vehicle, and a display controller that controls a display apparatus that shows information on a plurality of replacement facilities for replacement with a battery to be mounted on a vehicle.

Description of the Background Art

A system that obtains the number of replaceable batteries at a vehicle battery replacement station, obtains the number of vehicles in a queue at the replacement station, and outputs a state of operation of the replacement station based on such information has conventionally been available (for example, see, Chinese Patent Application Publication No. 109800899).

SUMMARY

According to a technique in Chinese Patent Application Publication No. 109800899, the user can know a replacement station including a sufficient number of replaceable batteries. In the technique in Chinese Patent Application Publication No. 109800899, a state of charge (SOC) of the replaceable battery is defined as at least 80%. At the same SOC=80%, however, an amount of charged electric power is different depending on a degree of deterioration of the battery. Therefore, a mileage with the replaced battery varies depending on the degree of deterioration of the replaced battery. With the technique in Chinese Patent Application Publication No. 109800899, disadvantageously, selection of a replacement station in consideration of the degree of deterioration of the replaceable battery cannot be made.

This disclosure was made to solve such a problem, and an object thereof is to provide a method of display control and a display controller that allow a user to select a replacement facility in consideration of a degree of deterioration of a battery.

A method of display control according to this disclosure is a method of display control by a controller that controls a display apparatus that shows information on a plurality of replacement facilities for replacement with a battery to be mounted on a vehicle. The method includes specifying for each replacement facility, by the controller, reference information on a degree of deterioration when a user selects the battery that is replaceable, the battery being stored at a replacement facility that satisfies a prescribed condition among the plurality of replacement facilities and controlling, by the controller, the display apparatus to show the reference information together with information on the replacement facility.

According to such a configuration, the reference information on the degree of deterioration when the user selects the replaceable battery stored at a replacement facility that satisfies the prescribed condition among the plurality of replacement facilities can be shown together with the information on the replacement facility. Consequently, the method of display control that allows the user to select a replacement facility in consideration of the degree of deterioration of the battery can be provided.

The controlling the display apparatus may include controlling, by the controller, the display apparatus so as to show an icon at a position of the replacement facility on a map as the information on the replacement facility and show the icon as the reference information in a manner different in accordance with contents of the reference information.

According to such a configuration, the information on the replacement facility and the reference information on the degree of deterioration of the replaceable battery stored at the replacement facility can be conveyed to the user in a readily understandable manner.

The controlling the display apparatus may include controlling, by the controller, the display apparatus so as to show as the reference information, an icon of a replacement facility where the degree of deterioration of the battery best in degree of deterioration is equal to or higher than a prescribed value and show an icon of a replacement facility where the degree of deterioration of the battery best in degree of deterioration is lower than the prescribed value, in manners different from each other.

According to such a configuration, the replacement facility where the degree of deterioration of the battery best in degree of deterioration is lower than the prescribed value and the replacement facility where the degree of deterioration of the battery best in degree of deterioration is equal to or higher than the prescribed value can be shown as being distinguished from each other. Consequently, the user can be informed of the replacement facility where the less deteriorated battery is stored, in a readily understandable manner.

The controlling the display apparatus may include controlling, by the controller, the display apparatus so as to show the number of vehicles that have reserved replacement of the battery at the replacement facility as the information on the replacement facility and show the number of batteries the degree of deterioration of which at the replacement facility is equal to or lower than a prescribed value as the reference information.

According to such a configuration, in replacement of the battery at the replacement facility, the user can determine whether or not replacement with a battery the degree of deterioration of which is equal to or lower than the prescribed value can be made.

The controlling the display apparatus may include controlling, by the controller, the display apparatus so as to show as the reference information, information on the battery the degree of deterioration of which is n+1th best at the replacement facility when there are n vehicles that have reserved replacement of the battery at the replacement facility.

According to such a configuration, in replacement of the battery at the replacement facility, the user can know the degree of deterioration of the replaced battery.

The method of display control may further include calculating as the reference information, by the controller, a possible mileage with the battery the degree of deterioration of which is n+1th best, and the controlling the display apparatus may include controlling, by the controller, the display apparatus so as to show the calculated possible mileage as the reference information.

According to such a configuration, in replacement of the battery at the replacement facility, the user can know the possible mileage with the replaced battery.

According to another aspect of this disclosure, a display controller controls a display apparatus that shows information on a plurality of replacement facilities for replacement with a battery to be mounted on a vehicle, and the display controller includes a processor and an interface with the display apparatus. The processor specifies for each replacement facility, reference information on a degree of deterioration when a user selects the battery that is replaceable, the battery being stored at a replacement facility that satisfies a prescribed condition among the plurality of replacement facilities and controls the display apparatus with the interface being interposed, to show the reference information together with information on the replacement facility.

According to such a configuration, the display controller that allows the user to select a replacement facility in consideration of the degree of deterioration of the battery can be provided.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a diagram showing an exemplary manner of display of the information representing the battery information of the replacement station in a second embodiment.

DESCRIPTION OF THE EMBODIMENTS

Figure 1:
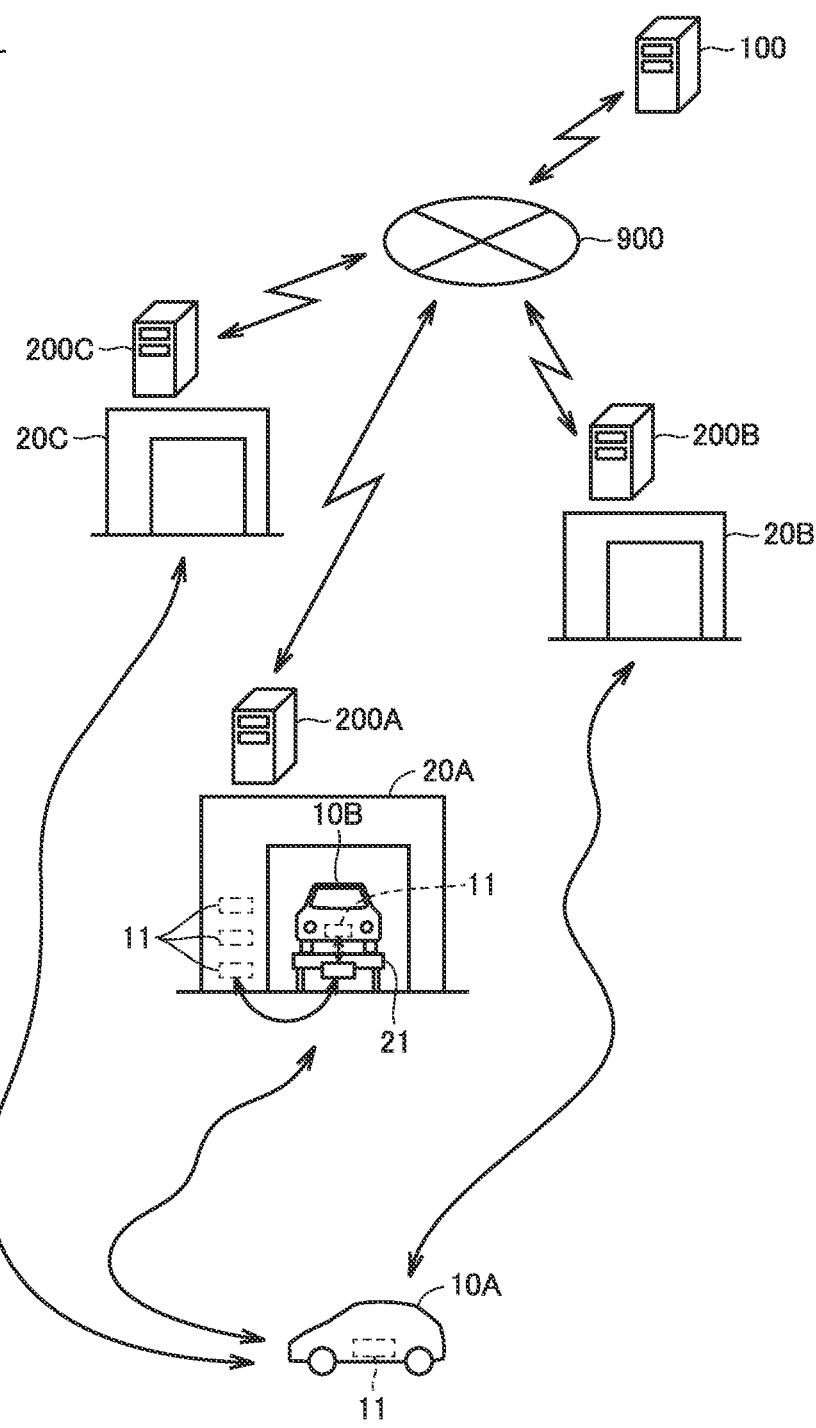
FIG. 1 is a diagram showing a configuration of a battery replacement information providing system according to this embodiment.

An embodiment of the present disclosure will be described in detail below with reference to the drawings. The same or corresponding elements in the drawings have the same reference characters allotted and description thereof will not be repeated.

First Embodiment

Figure 2:
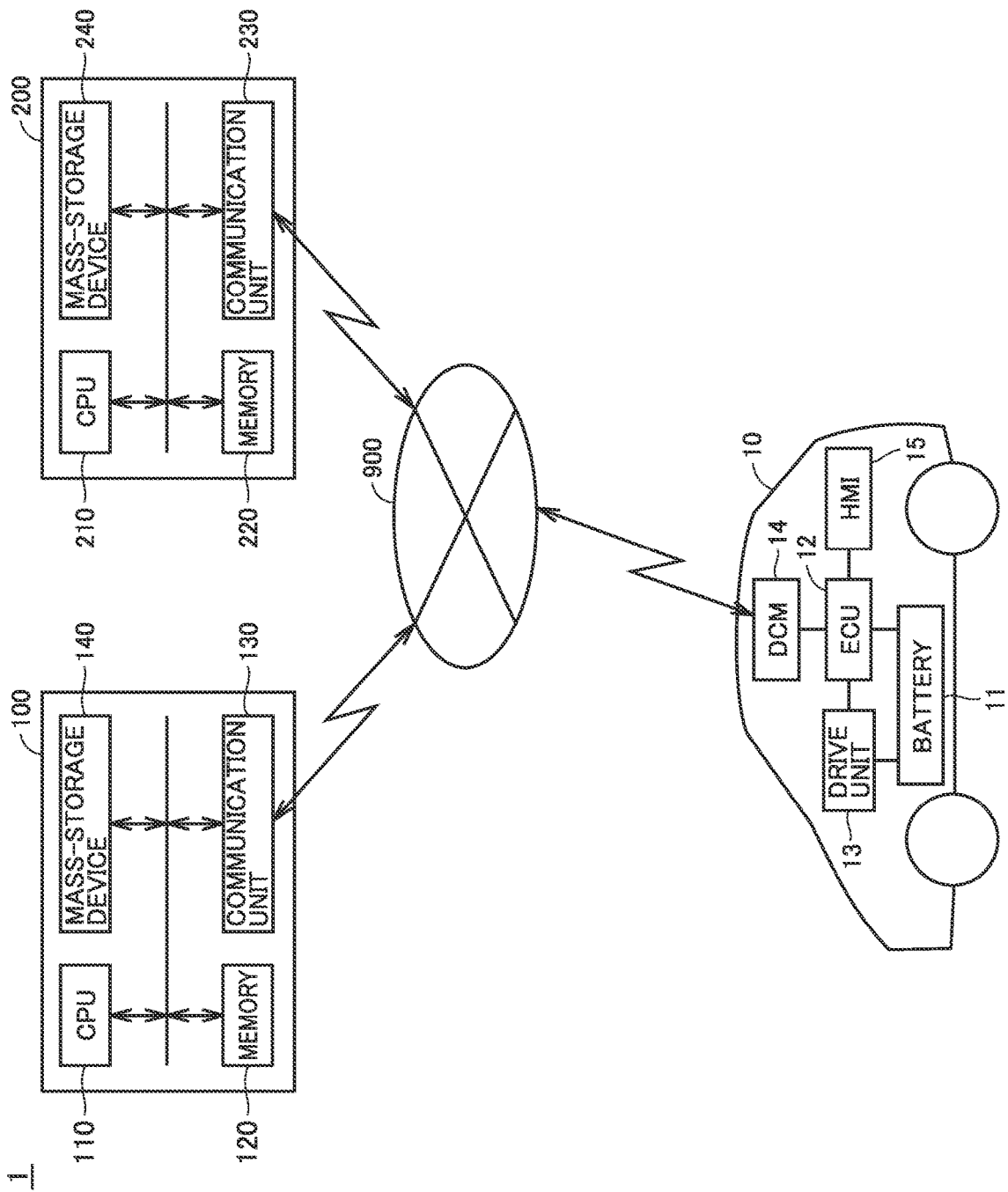
FIG. 2 is a block diagram showing overview of a configuration of each apparatus included in the battery replacement information providing system in this embodiment.

FIG. 1 is a diagram showing a configuration of a battery replacement information providing system 1 according to this embodiment. FIG. 2 is a block diagram showing overview of a configuration of each apparatus included in battery replacement information providing system 1 in this embodiment. Referring to FIGS. 1 and 2, battery replacement information providing system 1 includes a plurality of vehicles 10A to 10C (which are also representatively referred to as a "vehicle 10" below), a plurality of replacement stations 20A to 20C (which are also representatively referred to as a "replacement station 20" below), facility servers 200A to 200C (which are also representatively referred to as a "facility server 200" below) provided in respective replacement stations 20A to 20C, and a management server 100. Vehicles 10A and 10B, facility servers 200A to 200C, and management server 10 can communicate over a communication network 900.

Vehicle 10 includes a battery 11, an electronic control unit (ECU) 12, a drive unit 13, a data communication module (DCM) 14, and a human machine interface (HMI) 15. Electric power to be used for travel of vehicle 10 is stored in battery 11, and battery 11 is mounted on vehicle 10 as being replaceable by a replacement apparatus 21 which will be described later. Battery 11 is implemented, for example, by a lithium ion battery. Without being limited as such, battery 11 may be implemented by another type of battery such as a nickel metal hydride battery or an all-solid-state battery.

ECU 12 includes a central processing unit (CPU), a memory, a global positioning system (GPS), and an interface with HMI 15. The memory includes a random access memory (RAM) and a read only memory (ROM), and a program and data to be used by the CPU are stored therein. The CPU performs prescribed processing defined in the program in accordance with the program and the data stored in the memory and data inputted from the outside, and has data on a result of execution stored in the memory or outputs the data to the outside. The GPS detects position information of vehicle 10 and passes the position information to the CPU.

Drive unit 13 includes a motor generator and an inverter that drives the motor generator with electric power in battery 11 and charges battery 11 with electric power regenerated by the motor generator. Drive unit 13 may further include an engine that drives the motor generator or vehicle 10 by operating with fuel. In other words, vehicle 10 may be a battery electric vehicle (BEV) that includes the motor generator but does not include the engine or a hybrid electric vehicle (HEV) or a plug-in hybrid electric vehicle (PHEV) that includes the motor generator and the engine. Vehicle 10 may be a fuel cell electric vehicle (FCEV).

DCM 14 is a module for communication with an external apparatus over communication network 900, and transmits data from ECU 12 to the external apparatus and passes data from the external apparatus to ECU 12.

HMI 15 is an apparatus which is provided in the vicinity of a driver's seat of vehicle 10 and accepts information inputted from the user and outputs the information to ECU 12. HMI 15 gives information from ECU 12 to the user by display or through voice and sound, and includes, for example, a touch panel display.

Facility server 200 includes a CPU 210, a memory 220, a communication unit 230, and a mass-storage device 240. Memory 220 includes a random access memory (RAM) and a read only memory (ROM). Communication unit 230 can communicate with an external apparatus over communication network 900, and transmits data from CPU 210 to the external apparatus and passes data from the external apparatus to CPU 210. Mass-storage device 240 is implemented by a hard disk drive (HDD), a solid state drive (SSD), or the like, and a program and data to be used by CPU 210 are stored therein. CPU 210 performs prescribed processing defined in the program in accordance with the program and the data stored in memory 220 or mass-storage device 240 and data inputted from the external apparatus to communication unit 230, and has data on a result of execution stored in memory 220 or mass-storage device 240 or outputs the data to the external apparatus from communication unit 230.

Replacement station 20 includes replacement apparatus 21 and facility server 200. Though FIG. 1 shows an example in which a single replacement apparatus 21 is provided at a single replacement station 20, without being limited as such, a plurality of replacement apparatuses 21 may be provided at a single replacement station 20. Replacement apparatus 21 is managed by facility server 200 and controlled by a control unit of replacement apparatus 21 to detach battery 11 of vehicle 10 from vehicle 10, to move detached battery 11 to a storage location, to start charging of moved battery 11, to take charged battery 11 out of the storage location, and to attach taken-out battery 11 to vehicle 10.

Management server 100 includes a CPU 110, a memory 120, a communication unit 130, and a mass-storage device 140. Management server 100 manages replacement of battery 11 at replacement station 20. Functions of CPU 110, memory 120, communication unit 130, and mass-storage device 140 of management server 100 are similar to respective functions of CPU 210, memory 220, communication unit 230, and mass-storage device 240 of facility server 200 described previously. Communication unit 130 is an interface with HMI 15 of vehicle 10.

In battery replacement information providing system 1 described above, in connection with a plurality of replacement stations 20 within a prescribed range, the number of replaceable batteries 11 the SOC of which is 80% or higher may be presented to the user. By doing so, the user can know replacement station 20 provided with a sufficient number of replaceable batteries 11. In this case, the number of batteries 11 presented to the user may be the number of replaceable batteries the SOC of which is 80% or higher. At the same SOC=80%, however, an amount of charged electric power is different depending on a degree of deterioration of the battery. Therefore, a possible mileage with replaced battery 11 varies depending on the degree of deterioration of replaced battery 11. Thus, disadvantageously, selection of replacement station 20 in consideration of the degree of deterioration of replaceable battery 11 cannot be made.

The method of display control is a method of display control by ECU 12 or the like that controls HMI 15 that shows information on a plurality of replacement stations 20 for replacement with battery 11 to be mounted on vehicle 10. The method of display control includes specifying for each replacement station 20, by ECU 12 or the like, reference information on a degree of deterioration when a user selects replaceable battery 11 stored at replacement station 20 that satisfies a prescribed condition among the plurality of replacement stations 20 and controlling, by ECU 12 or the like, HMI 15 to show the reference information together with information on replacement station 20.

Thus, the reference information on the degree of deterioration when the user selects replaceable battery 11 stored at replacement station 20 that satisfies the prescribed condition among the plurality of replacement stations 20 can be shown together with the information on replacement station 20. Consequently, the user can select replacement station 20 in consideration of the degree of deterioration of battery 11.

Figure 3:
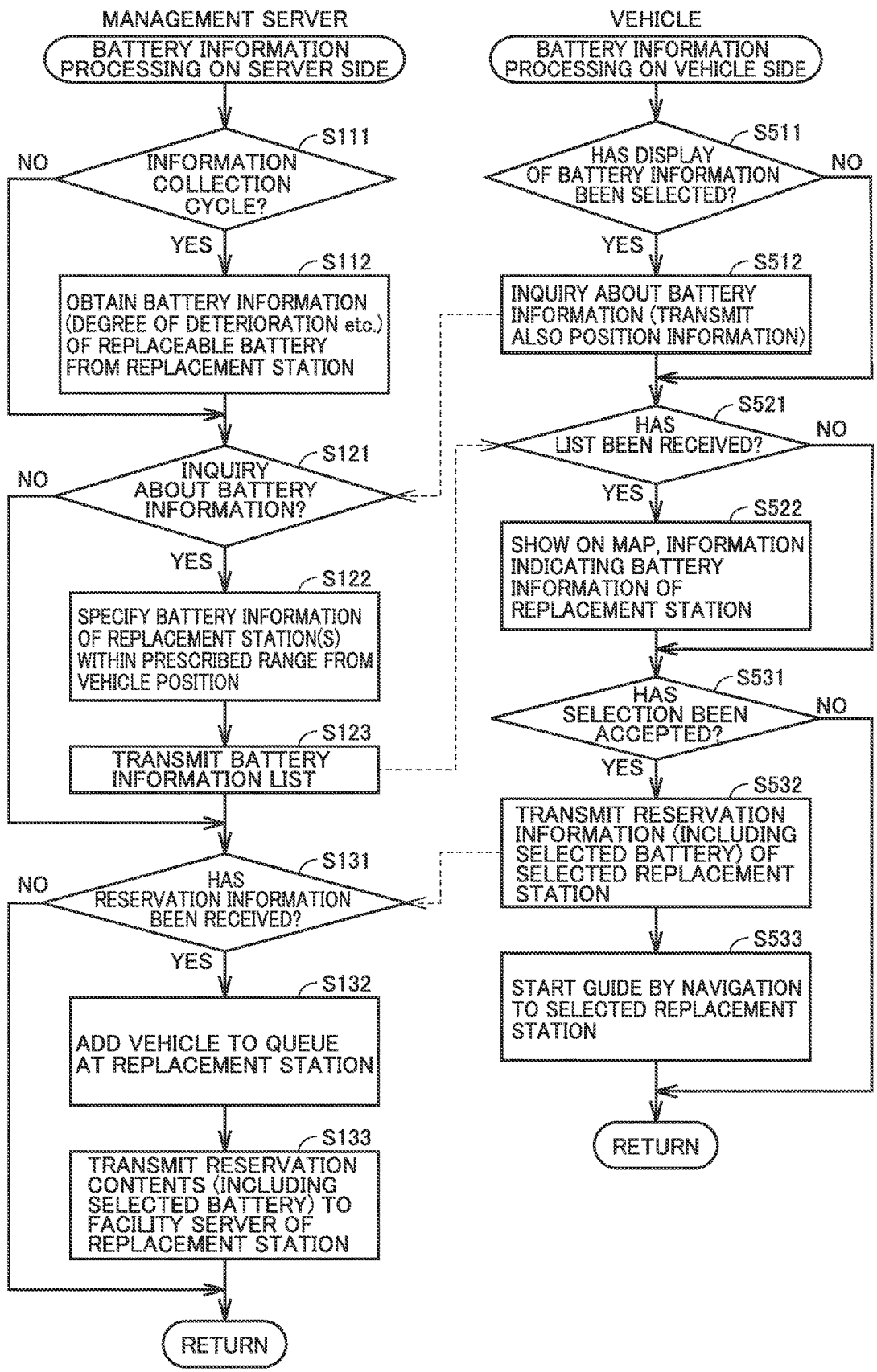
FIG. 3 is a flowchart showing a flow of processing in connection with battery information such as a degree of deterioration in this embodiment.

FIG. 3 is a flowchart showing a flow of processing in connection with battery information such as a degree of deterioration in this embodiment. Referring to FIG. 3, as processing relating to battery information, in management server 100, battery information processing on a server side is performed, and in vehicle 10, battery information processing on a vehicle side is performed. The battery information processing on the server side is performed as being called every prescribed cycle from higher-order processing by CPU 110 of management server 100. The battery information processing on the vehicle side is performed as being called every prescribed cycle (for example, a certain cycle between several milliseconds and several ten milliseconds) from higher-order processing by ECU 12 of vehicle 10.

At replacement station 20, facility server 200 specifies information on replacement station 20 and battery information on stored battery 11 such as the number of vehicles 10 that wait for replacement of battery 11, the number of replaceable batteries 11 stored in a state charged to a prescribed SOC (for example, 80% or higher or 100%), and a state of health (SOH) of replaceable battery 11. The SOC represents a ratio of a remaining capacity to a full charge capacity. The SOH represents a ratio of a current full charge capacity to an initial full charge capacity.

CPU 110 of management server 100 determines whether or not a cycle to collect information on replacement station 20 has come (step S111). When CPU 110 determines that the cycle to collect information has come (YES in step S111), it obtains information on a waiting state such as the number of waiting vehicles 10, the number of replaceable batteries 11 stored in the state charged to the prescribed SOC, and the SOH of replaceable battery 11 from facility servers 200 of the plurality of replacement stations 20 managed by management server 100 and has the information stored in mass-storage device 140 (step S112).

In vehicle 10, ECU 12 determines whether or not an operation to select display of the battery information on a map shown on HMI 15 has been performed onto HMI 15 by the user (step S511). When ECU 12 determines that display of the battery information has been selected (YES in step S511), it controls DCM 14 to transmit information on the current position of vehicle 10 to management server 100 and makes an inquiry at management server 100, about the battery information at replacement station 20 (step S512).

In management server 100, when CPU 110 determines that the cycle to collect information has not yet come (NO in step S111) or after step S112, it determines whether or not it has received the inquiry about the battery information from vehicle 10 (step S121).

When CPU 110 determines that it has received the inquiry about the battery information (YES in step S121), it specifies the battery information of replacement station(s) 20 within a prescribed range from the received position of vehicle 10 (for example, a range within a prescribed radius or a range where expected time before arrival is within a prescribed time period) (step S122).

CPU 110 controls communication unit 130 to transmit to vehicle 10, a list of the battery information of replacement station(s) 20 within the prescribed range from the position of vehicle 10 (step S123).

In vehicle 10, when ECU 12 determines that display of the battery information has not been selected (NO in step S511) or after step S512, it determines whether or not it has received the list of the battery information from management server 100 (step S521).

When ECU 12 determines that it has received the list of the battery information (YES in step S521), it controls HMI 15 to show the information indicating the battery information of replacement station(s) 20 on the map shown on HMI 15 based on the received list of the battery information (step S522).

Figure 4:
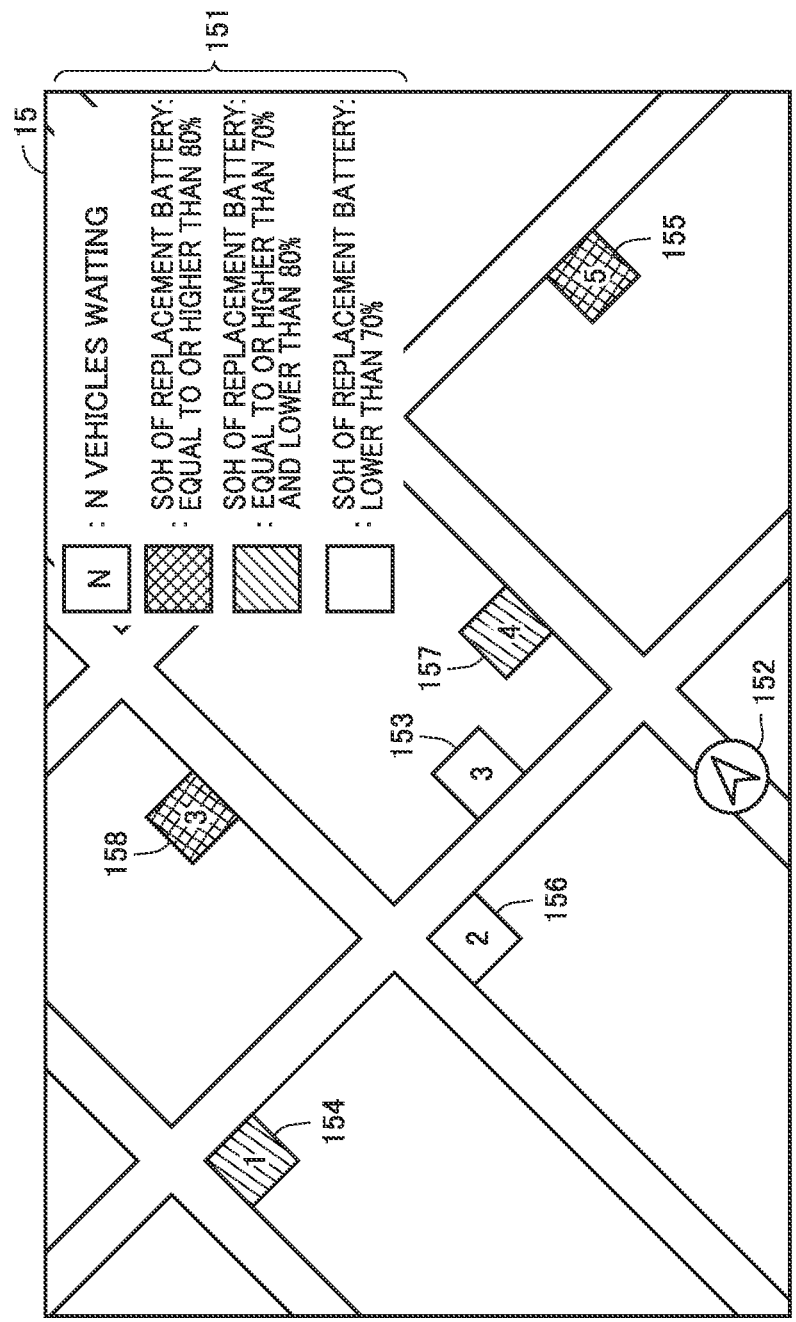
FIG. 4 is a diagram showing an exemplary manner of display of information representing the battery information of a replacement station in a first embodiment.

FIG. 4 is a diagram showing an exemplary manner of display of information representing the battery information of replacement station 20 in a first embodiment. Referring to FIG. 4, a legend 151, an icon 152 indicating the current position of vehicle 10, and icons 153 to 158 indicating positions of replacement stations 20 are shown on the map shown on HMI 15. In each of icons 153 to 158 indicating the positions of replacement stations 20, the number of vehicles 10 that wait for replacement of batteries 11 at replacement station 20 is shown. Icons 153 to 158 are shown in different manners (in a deeper color when the SOH is 80% or higher, in the same color at an intermediate density when the SOH is equal to or higher than 70% and lower than 80%, and in the same color lower in density when the SOH is lower than 70%) depending on the SOH of battery 12 which is N+1th best in SOH when N vehicles are waiting.

Referring back to FIG. 4, in vehicle 10, when ECU 12 determines that it has not received the list of the battery information (NO in step S521) or after step S522, it determines whether or not selection of the icon of replacement station 20 has been accepted by touching by the user onto a touch panel on the screen on HMI 15 (step S531).

When ECU 12 determines that selection of the icon has been accepted (YES in step S531), it controls DCM 14 to transmit to management server 100, information for identifying vehicle 10, information indicating selected replacement station 20, information indicating expected time of arrival, and information that allows identification of selected battery 11, as information for reservation of selected replacement station 20 (step S532).

ECU 12 then controls HMI 15 to start guidance to selected replacement station 20 by a navigation system (step S533). When ECU 12 determines that selection of the icon has not been accepted (NO in step S531) or after step S533, it has processing to be performed return to higher-order processing from which this battery information processing on the vehicle side was called.

In management server 100, CPU 110 determines whether or not it has received reservation information from vehicle 10 (step S131). When CPU 110 determines that it has received the reservation information (YES in step S131), it adds vehicle 10 to a queue at replacement station 20 based on the reservation information (step S132).

CPU 110 then controls communication unit 130 to transmit the information indicating vehicle 10, the information indicating expected time of arrival, and the information that allows identification of selected battery 11 as reservation contents to facility server 200 of replacement station 20 to be reserved (step S133). When CPU 110 determines that it has not received the reservation information (NO in step S131) or after step S133, it has processing to be performed return to higher-order processing from which this battery information processing on the server side was called.

Second Embodiment

In the first embodiment, the degree of deterioration of replaceable battery 11 at replacement station 20 is distinguished based on the manner of display of the icon on the map indicating replacement station 20. In a second embodiment, information indicating the degree of deterioration of replaceable battery 11 at replacement station 20 is shown in a form of a list, so as to distinguish the degree of deterioration of replaceable battery 11 at replacement station 20.

FIG. 5 is a diagram showing an exemplary manner of display of the information representing the battery information of replacement station 20 in the second embodiment. Referring to FIG. 5, in a list 159 shown on HMI 15, the name of replacement station 20, expected time before arrival at that replacement station 20 from the current position, the number of waiting vehicles at that replacement station 20, the number of batteries 11 the SOH of which is equal to or higher than 70%, the best SOH among the SOHs of replaceable batteries at that replacement station 20, the N+1th best SOH among the SOHs of replaceable batteries when N vehicles are waiting, and a possible mileage of vehicle 10 with the current SOC of battery 11 N+1th best in SOH.

Modification (1) In the embodiment described previously, as shown in FIGS. 1 and 2, battery 11 of vehicle 10 is automatically replaced by replacement apparatus 21 at replacement station 20. Without being limited as such, battery 11 of vehicle 10 may manually be replaced by a worker at replacement station 20.

(2) In the embodiment described previously, as shown in FIGS. 1 to 5, the display apparatus that shows the information on replacement station 20 is HMI 15. Without being limited as such, any other display apparatus that shows the information on replacement station 20 may be applicable, and for example, a portable terminal carried by the user may be applicable.

(3) In the embodiment described previously, as shown in FIG. 4, the degree of deterioration (for example, the SOH) is distinguished based on a different density of the color of the icon indicating replacement station 20. Without being limited as such, any manner that allows distinction of the degree of deterioration may be applicable, and a size, a shape, a design, or a hue of the icon, or a combination thereof may be different. In some embodiments, replacement station 20 where battery 11 low in degree of deterioration (less deteriorated) is stored is shown in an eye-catching manner.

(4) In the embodiment described previously, as shown in FIGS. 3 to 5, information on the degree of deterioration is presented to the user as reference information in selection by the user of replaceable battery 11 stored at replacement station 20. The SOH indicating deterioration of the capacity is employed as this degree of deterioration. Without being limited as such, another indicator may be employed as the degree of deterioration. For example, a state of function (SOF) indicating deterioration of output and input which is deterioration of maximum power for charging and discharging or an internal resistance may be employed.

(5) In the embodiment described previously, as shown in FIG. 4, when N vehicles are waiting at replacement station 20, icons 153 to 158 are shown in such a manner as allowing distinction of the degree of deterioration N+1th best among degrees of deterioration of replaceable batteries 11 at replacement station 20. Without being limited as such, the manner of display of icons 153 to 158 may be a manner that allows identification of the best degree of deterioration among the degrees of deterioration of replaceable batteries 11 or a manner that allows identification of a representative value such as an average value, a median value, or a deviation of the degrees of deterioration of replaceable batteries 11.

(6) In the embodiment described previously, as shown in FIGS. 4 and 5, the reference information on the degree of deterioration in selection by the user of replaceable battery 11 is information as shown in FIGS. 4 and 5. Without being limited as such, the reference information on the degree of deterioration may be another type of information. For example, the degree of deterioration of battery 11 best in degree of deterioration among replaceable batteries 11, the degree of deterioration of battery 11 worst in degree of deterioration among replaceable batteries 11 (in this case, the user can know the lower limit), an average value of the degrees of deterioration of replaceable batteries 11, or the number of (good) batteries 11 the degree of deterioration of which is lower than a prescribed value may be applicable.

(7) In the embodiment described previously, as shown in FIGS. 4 and 5, either icons 153 to 158 different in manner of display or list 159 of information indicating the degree of deterioration are/is shown as the information indicating the degree of deterioration of replaceable battery 11 at replacement station 20. Without being limited as such, list 159 in FIG. 5 may be shown together with icons 153 to 158 on the map shown in FIG. 4. When icons 153 to 158 shown in FIG. 4 are selected, information on replacement station 20 corresponding to a selected icon in list 159 in FIG. 5 may be shown.

(8) In the embodiment described previously, as shown in FIG. 3, processing in step S111, step S112, step S122, step S123, and step S133 is performed by CPU 110 of management server 100. Without being limited as such, such processing may be performed by another controller such as ECU 12 of vehicle 10.

(9) In the embodiment described previously, as shown in FIG. 3, processing in step S511 to step S533 is performed by ECU 12 of vehicle 10. Without being limited as such, such processing may be performed by another controller such as a portable terminal carried by the user.

(10) In the embodiment described previously, as shown in step S122 in FIG. 3, the battery information of replacement station 20 that satisfies such a condition as being within the prescribed range from the position of vehicle 10 is specified. The condition of replacement station 20 the battery information of which is to be specified is not limited as such, and another prescribed condition may be applicable. For example, such a condition as replacement station 20 belonging to a corporate in which a user of vehicle 10 is registered as a member may be applicable.

(11) The embodiment described previously can be understood as the disclosure of battery replacement information providing system 1, vehicle 10, management server 100, or facility server 200, or can be understood as the disclosure of a control method or a control program for performing prescribed processing by battery replacement information providing system 1, vehicle 10, management server 10, or facility server 200.

SUMMARY (1) As shown in FIGS. 1 to 3, a method of display control is a method of display control by CPU 110 of management server 100 and ECU 12 of vehicle 10 that controls HMI 15 that shows information on a plurality of replacement stations 20 for replacement with battery 11 to be mounted on vehicle 10. As shown in FIGS. 3 to 5, the method includes specifying for each replacement station 20, by CPU 110 of management server 100, reference information on a degree of deterioration when a user selects replaceable battery 11 stored at replacement station 20 that satisfies a prescribed condition among the plurality of replacement stations 20 (for example, step S122) and controlling, by ECU 12 of vehicle 10, HMI 15 to show the reference information together with information on replacement station 20 (for example, the position shown in FIG. 4 and "name", "expected time before arrival," and "the number of waiting vehicles" shown in FIG. 5) (for example, step S522).

Thus, the reference information on the degree of deterioration when the user selects replaceable battery 11 stored at replacement station 20 that satisfies the prescribed condition among the plurality of replacement stations 20 can be shown together with the information on replacement station 20. Consequently, the user can select replacement station 20 in consideration of the degree of deterioration of battery 11.

(2) As shown in FIG. 4, the controlling HMI 15 may include controlling, by ECU 12 of vehicle 10, HMI 15 so as to show icons 153 to 158 at positions of replacement stations 20 on a map as the information on replacement station 20 and show icons 153 to 158 as the reference information in a manner different in accordance with contents of the reference information.

Thus, the information on replacement station 20 and the reference information on the degree of deterioration of replaceable battery 11 stored at replacement station 20 can be conveyed to the user in a readily understandable manner.

(3) As shown in FIG. 4, the controlling HMI 15 may include controlling, by ECU 12 of vehicle 10, HMI 15 so as to show as the reference information, an icon of replacement station 20 where a degree of deterioration of battery 11 best in degree of deterioration (which may be, for example, battery 11 best in degree of deterioration at replacement station 20 or battery 11 N+1th best in degree of deterioration among remaining batteries 11 in an example where N vehicles are waiting at replacement station 20) is equal to or higher than a prescribed value and show an icon of a replacement station 20 where the degree of deterioration of battery 11 best in degree of deterioration is lower than the prescribed value, in manners different from each other.

Thus, replacement station 20 where the degree of deterioration of battery 11 best in degree of deterioration is lower than the prescribed value and replacement station 20 where the degree of deterioration of battery 11 best in degree of deterioration is equal to or higher than the prescribed value can be shown as being distinguished from each other. Consequently, the user can be informed of replacement station 20 where less deteriorated battery 11 is stored, in a readily understandable manner.

(4) As shown in FIG. 5, the controlling HMI 15 may include controlling, by ECU 12 of vehicle 10, HMI 15 so as to show the number of vehicles 10 (for example, "the number of waiting vehicles" in FIG. 5) that have reserved replacement of battery 11 at replacement station 20 as the information on replacement station 20 and show the number of batteries (for example, "the number of batteries 11 SOH of which is equal to or higher than 70%" in FIG. 5) a degree of deterioration of which at replacement station 20 is equal to or lower than a prescribed value as the reference information.

Thus, in replacement of battery 11 at replacement station 20, the user can determine whether or not replacement with battery 11 the degree of deterioration of which is equal to or lower than the prescribed value can be made.

(5) As shown in FIG. 5, the controlling HMI 15 may include controlling, by ECU 12 of vehicle 10, HMI 15 so as to show as the reference information, information (for example, "next best SOH" in FIG. 5) on battery 11 a degree of deterioration of which is N+1th best at replacement station 20 when there are N vehicles 10 that have reserved replacement of battery 11 at replacement station 20.

Thus, in replacement of battery 11 at replacement station 20, the user can know the degree of deterioration of replaced battery 11.

(6) As shown in FIG. 5, the method of display control may further include calculating as the reference information, by CPU 110 of management server 100 or ECU 12 of vehicle 10, a possible mileage with battery 11 the degree of deterioration of which is n+1th best (which may be calculation in step S122 or calculation in step S522 in FIG. 3). The controlling HMI 15 may include controlling, by ECU 12 of vehicle 10, HMI 15 so as to show the calculated possible mileage (for example, "possible mileage with that SOH" in FIG. 5) as the reference information.

Thus, in replacement of battery 11 at replacement station 20, the user can know the possible mileage with replaced battery 11.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A method of display control by a controller that controls a display apparatus that shows information on a plurality of replacement facilities for replacement with a battery to be mounted on a vehicle, the method comprising:

specifying for each replacement facility, by the controller, reference information on a degree of deterioration when a user selects the battery that is replaceable, the battery being stored at a replacement facility that satisfies a prescribed condition among the plurality of replacement facilities; and controlling, by the controller, the display apparatus to show the reference information together with information on the replacement facility.

2. The method of display control according to claim 1, wherein the controlling the display apparatus includes controlling by the controller, the display apparatus so as to show an icon at a position of the replacement facility on a map as the information on the replacement facility and show the icon as the reference information in a manner different in accordance with contents of the reference information.

3. The method of display control according to claim 2, wherein the controlling the display apparatus includes controlling by the controller, the display apparatus so as to show as the reference information, an icon of a replacement facility where the degree of deterioration of the battery best in degree of deterioration is equal to or higher than a prescribed value and an icon of a replacement facility where the degree of deterioration of the battery best in degree of deterioration is lower than the prescribed value, in manners different from each other.

4. The method of display control according to claim 1, wherein the controlling the display apparatus includes controlling by the controller, the display apparatus so as to show the number of vehicles that have reserved replacement of the battery at the replacement facility as the information on the replacement facility and show the number of batteries the degree of deterioration of which at the replacement facility is equal to or lower than a prescribed value as the reference information.

5. The method of display control according to claim 1, wherein the controlling the display apparatus includes controlling by the controller, the display apparatus so as to show as the reference information, information on the battery the degree of deterioration of which is n+1th best at the replacement facility when there are n vehicles that have reserved replacement of the battery at the replacement facility.

6. The method of display control according to claim 5, further comprising calculating as the reference information, by the controller, a possible mileage with the battery the degree of deterioration of which is n+1th best, wherein the controlling the display apparatus includes controlling by the controller, the display apparatus so as to show the calculated possible mileage as the reference information.

7. A display controller that controls a display apparatus that shows information on a plurality of replacement facilities for replacement with a battery to be mounted on a vehicle, the display controller comprising:

a processor; and an interface with the display apparatus, wherein the processor specifies for each replacement facility, reference information on a degree of deterioration when a user selects the battery that is replaceable, the battery being stored at a replacement facility that satisfies a prescribed condition among the plurality of replacement facilities; and controls the display apparatus with the interface being interposed, to show the reference information together with information on the replacement facility.

* * * * *